(12) United States Patent
Markley et al.

(10) Patent No.: US 10,424,293 B1
(45) Date of Patent: Sep. 24, 2019

(54) USING AUDIO INPUT AND OUTPUT TO INTERACT WITH TEXT-BASED INTERACTIVE CONTENT

(71) Applicant: Amazon Technologies, Inc., Seattle, WA (US)

(72) Inventors: David Allen Markley, Bellevue, WA (US); Ethan Zane Evans, Snoqualmie, WA (US)

(73) Assignee: Amazon Technologies, Inc., Seattle, WA (US)

(*) Notice: Subject to any disclaimer, the term of this patent is extended or adjusted under 35 U.S.C. 154(b) by 511 days.

(21) Appl. No.: 14/804,787

(22) Filed: Jul. 21, 2015

(51) Int. Cl.
  *G10L 15/20* (2006.01)
  *G10L 13/02* (2013.01)
  *G06F 3/16* (2006.01)

(52) U.S. Cl.
  CPC .............. *G10L 15/20* (2013.01); *G10L 13/02* (2013.01); *G06F 3/16* (2013.01); *G06F 3/167* (2013.01)

(58) Field of Classification Search
  CPC . G06F 3/167; G06F 3/16; G10L 13/02; G10L 15/20
  See application file for complete search history.

(56) References Cited

U.S. PATENT DOCUMENTS

| 8,414,390 B1* | 4/2013 | Paleja | A63F 13/358 463/29 |
| 9,449,526 B1* | 9/2016 | Tseng | G09B 7/02 |
| 2006/0080702 A1* | 4/2006 | Diez | A63F 13/12 725/30 |
| 2006/0247021 A1* | 11/2006 | Bulthuis | A63F 13/10 463/24 |
| 2007/0033005 A1* | 2/2007 | Cristo | G06F 17/279 704/9 |
| 2007/0065787 A1* | 3/2007 | Raffel | A63F 9/00 434/177 |
| 2007/0265850 A1* | 11/2007 | Kennewick | G10L 15/22 704/257 |
| 2010/0227685 A1* | 9/2010 | Mori | A63F 13/10 463/30 |
| 2012/0079095 A1* | 3/2012 | Evans | G06F 8/61 709/224 |
| 2012/0142429 A1* | 6/2012 | Muller | A63F 13/35 463/42 |
| 2014/0087883 A1* | 3/2014 | Lee | A63F 13/12 463/42 |

* cited by examiner

*Primary Examiner* — Ting Z Lee
(74) *Attorney, Agent, or Firm* — Lee & Hayes, P.C.

(57) ABSTRACT

Functionality is disclosed herein for using an interactive content service to provide content. A user may interact with the interactive content service to access interactive content, such as interactive fiction, interactive text adventure games, and other interactive content. A user may also use the interactive content to receive auditory output from applications configured to provide text-based content. The interactive content service maintains state information that identifies the current state of the interactive content. For example, before starting a particular interactive adventure game, the state identifies a beginning location within the interactive content. As the user interacts with the game, the interactive content service updates the state of the user within the game. In this way, when the user resumes playing the game, regardless of the computing device used to interact with the interactive content service, the interactive content service causes the correct portion of the interactive content to be presented.

16 Claims, 8 Drawing Sheets

USING AUDIO INPUT AND OUTPUT TO INTERACT WITH TEXT-BASED INTERACTIVE CONTENT

BACKGROUND

Interactive fiction applications, such as text adventure games, allow a user to interact with textual content. Generally, interactive fiction applications are literary narratives that include text adventure games. The widespread availability of these adventure games has been due, at least in part, to their text-only nature. Instead of a developer being required to port a game including graphics (e.g., a graphical user interface) to many different platforms, the developer could easily port the text adventure game to a different platform by simply recompiling the text adventure game.

Interactive fiction may be produced by a variety of different developers using development systems that are freely available. Some of the interactive content developed today may include only text whereas other interactive content may include text, pictures, animations, or video. The interactive fiction might also include stories where the reader may select different choices that determine the outcome of the story. For example, different choices made by a user will present the user with different portions of the story depending on the choice. Users can access a large variety of interactive fiction and interactive storytelling data files that can be used with freely available text based parsers and interpreters. It can be difficult, however, for some users to access and utilize this content.

DETAILED DESCRIPTION

Figure 1:
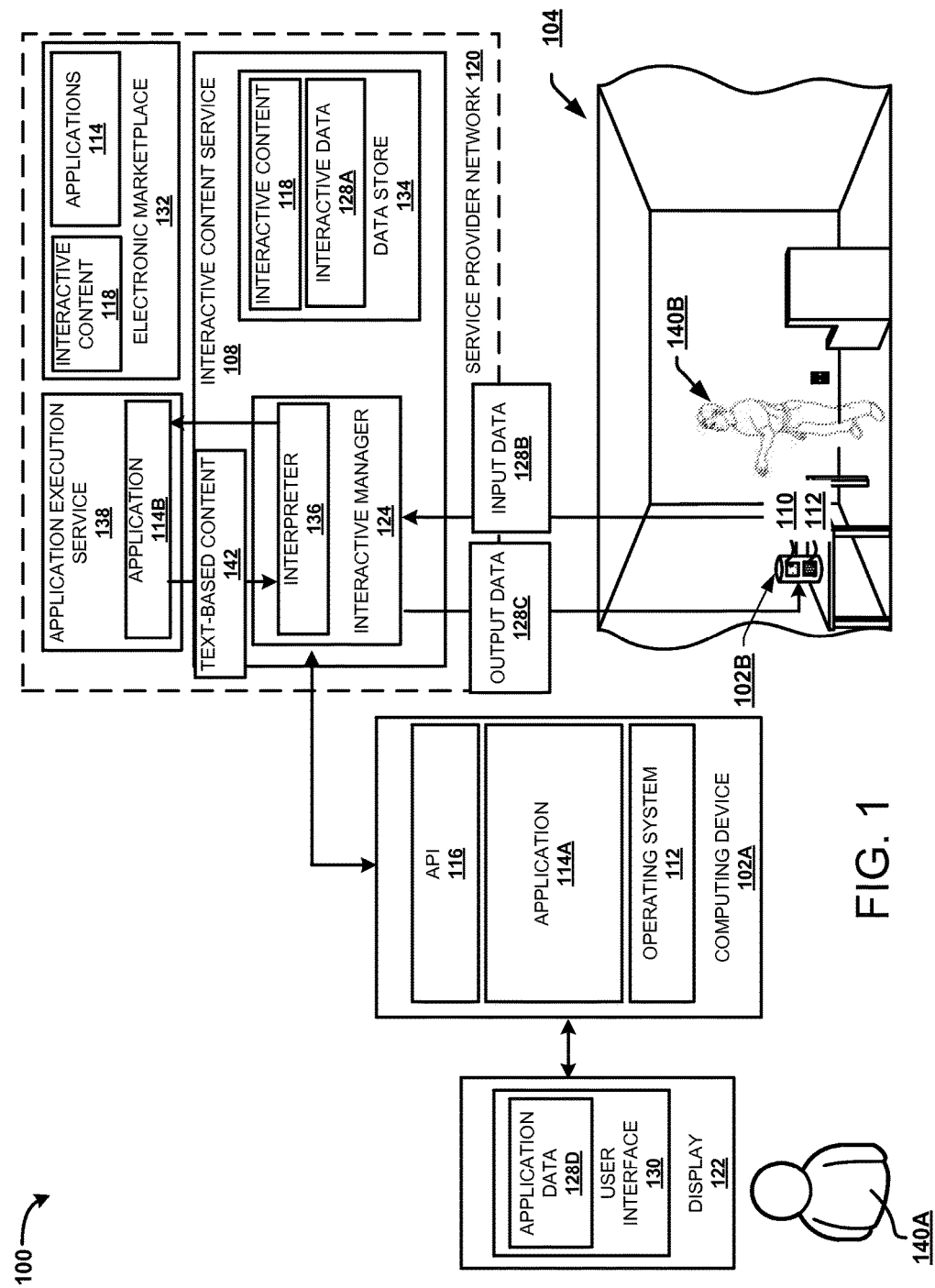
FIG. 1 is a block diagram depicting an illustrative operating environment in which an interactive content service provides interactive content to a user.

The following detailed description is directed to technologies for enabling the use of audio input and audio output to interact with content, such as text-based interactive content as well as other types of text-based content. Functionality is disclosed herein for using an interactive content service to provide users with the ability to interact with interactive fiction, other types of interactive content (e.g., adventure games, or interactive books), as well as text-based content provided by an application executing.

In some examples, the interactive content service is a network-based service that is associated with a service provider network. "Interactive content" may include but is not limited to interactive fiction, interactive novels, and interactive storytelling. Generally, interactive content includes any content in which the input of a user controls the flow of the game, story, discussion, or application.

Instead of requiring a user to interact with text-based interactive content using textual input, users are able to use speech to control the interactive content utilizing an implementation of the technologies disclosed herein. A network-based interactive content service receives the speech input and determines the content to provide based on the speech. The content may be determined from text-based interactive content or text-based content provided by some other application. Instead of displaying the content as text (and possibly pictures) on a display as text-based applications do, the interactive content service may provide the content to the user as speech using a device in an environment of the user. For example, a device near the user that includes a speaker may present the interactive content as audio output.

In some configurations, a framework is provided by the interactive content service that allows a developer, or some other user, to convert the text-based interactive content into auditory content. For example, the framework may provide the developer with tools to record the different portions of the text-based interactive content. The recorded content may be stored at the interactive content service and/or at some other location, such as a location associated with the developer. In some examples, all or a portion of the text-based interactive content may be programmatically translated using a text-to-speech engine.

The framework might also support different formats for creating new interactive content. For example, the framework may provide a development system that supports the creation of the interactive content in one or more of the publicly available interactive fiction formats and/or some other format. For example, the interactive content service may support the TEXT ADVENTURE DEVELOPMENT SYSTEM ("TADS") or the ADVENTURE DEVELOPMENT & RUNNER—INTERACTIVE FICTION TOOLKIT ("ADRIFT") development systems. Other development systems that might be supported include ALAN, CHOICESCRIPT, HUGO, INFINIQUEST, JACL, QUEST, SUDS, TWINE, and the like. In this way, the network-based interactive content service may include interactive content expressed using many different formats.

The interactive content service might also utilize a variety of interpreters when interpreting the interactive content created with one of the many available development systems. For example, the interactive content service might utilize functionality similar to the FROTZ, GARGOYEL, OR TEXT FICTION interpreters.

In some examples, the interactive content service may use different devices within an environment of the user during an interactive session. For example, initially a user may be located in their living room and at some later point, the user may move to their kitchen or some other location in their house. According to some configurations, the interactive content service identifies the devices within an environment, detects the location of the user, and selects the device closest to the user to interact with the user. The change in the location of the user might also be used to change the content that is provided. For example, the user moving from the kitchen to some other location in the house may trigger the interactive content service to change the content provided to the user.

The interactive content service may also store state information for different interactive sessions. For example, the interactive content service may store state information associated with the interactive content for different registered users of the interactive content service. In this way, the content provider does not need to maintain the state information for each of the different users as different users interact with the content. As such, the content provider can focus efforts on creating the interactive content instead of supporting the use of the interactive content.

In some configurations, the framework provides an Application Programming Interface ("API") that may be used by applications to interact with the environment. Generally speaking, "application" may refer to any set of program instructions or data a processor reads to perform some task or operation. In some examples, an application may be part of the system software (e.g., the operating system) or might be application software (e.g., end-user programs). The API may provide functionality for interacting with the interactive content service.

In some examples, interactive content providers may develop interactive content using a software developer toolkit ("SDK") that may include one or more APIs, that specifies functionality for providing interactive content to the interactive content service or other tools that might be used by an interactive content providers to develop interactive content.

As an example, an interactive content provider may develop children's interactive fiction using tools (e.g., the framework, APIs or SDK) provided by the interactive content service. After development, the interactive fiction may be made available to users via the interactive content service. In some cases, a user might be able to modify the content. For instance, the interactive content provider may allow a user to provide voices for one or more of the characters in the interactive fiction. In this way, the child interacting with the interactive fiction may hear a parent's voice (or some other known individual) during all or parts of the story. The content provided by the user might be stored locally on a user computing device or stored by the interactive content service.

During a time the child is interacting with the interactive fiction, the interactive content service receives speech input from the child, and determines the content to provide based on the speech input. The interactive content service also provides the content to the child, and stores the state of the story. In this way, the interactive content provider may focus on developing content instead of having to worry about supporting all of the different users that access the content. Additional details regarding the various components and processes described above for will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

Referring now to FIG. 1, an operating environment 100 is illustrated in which an interactive content service provides content to a user, according to various examples presented herein. The operating environment 100 shown in FIG. 1 includes computing devices 102A-102B, interactive content service 108, environment 104, and electronic marketplace 132.

According to some configurations, the computing devices 102 may be configured as a tablet computing device, a smart phone, a personal computer ("PC"), a desktop computer, a laptop computer, a notebook computer, other mobile computing devices, a video game system, a set-top box, a smart television, or the like. According to other examples, at least a portion of the functionality of the computing device 102 may be provided by the interactive content service 108, or a service provider network 120.

The computing devices 102A-102B, which may be referred to as "computing devices 102 or devices 102", may include a variety of different electronic devices that are within an environment, such as an environment 104 and coupled to the service provider network 120 and/or some other computing device 102 or service via one or more networks (not shown). The computing devices 102 might be operative to provide audio output (e.g., one or more speakers), video output, audio input (e.g., one or more microphones), and the like. In some examples, a computing device 102 may be stationary within an environment. In other examples, a computing device 102 may move within an environment (e.g. a computing device may move with the user 140B, or some other user. In some configurations, one or more of the computing devices 102 may include one or more sensors.

The sensors may sense a variety of different data. For example, the sensors may sense location data (such as obtained from the GLOBAL POSITIONING SYSTEM ("GPS"), BLUETOOTH, BLUETOOTH LE, RF, or any other applicable location sensor), time, date, physical environment (such as temperature, altitude, humidity, biometric pressure), device orientation, the proximity of other devices with relevant data (such as a beacon or friend with a suitable device), the proximity of other users, biometric data (such as pulse, heart rate variability, blood oxygenation, body temperature, blood sugar, sleep, what the user is viewing), and the like.

The interactive content service 108, or the service provider network 120 may include one or more application servers, Web servers, data storage systems, network appliances, dedicated hardware devices, and/or other server computers or computing devices for providing the functionality of the different services. In these examples, the computing devices 102 can include minimal hardware for connection to a network-based computing platform via a network (not shown). The computing devices 102 may communicate via the network to access various services or computing resources described herein. For example, the computing device 102A and the computing device 102B can access the interactive content service 108, and/or the electronic marketplace 132. More details regarding the operation of the interactive content service 108 are provided below.

The computing devices 102 can be configured to execute an operating system 112, applications 114, an interactive content service API 116, as well as other application programs or components. In some configurations, the application execution service 138 may be configured to execute the applications 114. The applications 114 might include applications related to interactive content, games, productivity applications (e.g., word processing, spreadsheet, and/or presentation applications), travel applications, fitness applications, restaurant applications, social network applications, or any other applications. In some examples, one or more of the applications 114 may be configured to utilize the interactive content service API 116. According to some configurations, the applications might be part of the operating system 112 and/or some other component.

The electronic marketplace 132 allows users to acquire content (e.g., purchase or free), such as, for example, interactive content 118, the applications 114, application add-ons, in-application items, music, e-books, movies, and the like. All or a portion of the applications 114 utilized by the computing device 102 and/or the users 140A-140B may be programmed to interact with the interactive content service 108. For example, application 114A may utilize functionality provided by the interactive content service API 116 to interact with the interactive content service 108 and the computing devices 102A-102B.

Input to the interactive content service 108, or the applications 114 may be provided via one or more input devices that are connected to or otherwise are in communication with the computing device 102. In some examples, the computing devices, such as the computing device 102B includes a speaker 110 and a microphone 112. The input can be used to by the applications 114, and/or the interactive network service 108 to control aspects of providing the interactive content 118 to a user, such as the user 140B in the environment 104. For example, the computing device 102B may obtain speech input from the user 140B and provide the speech input to the interactive manager 124 located in the interactive content service 108. Similarly, the computing device 102B may provide audio output (e.g., speech) to the user 140B using the speaker 112. Some of the computing devices 102 may also be configured to present visual content provided by one or more applications 114, or services, on one or more display devices that are built-in to or are external to and in communication with a computing device 102, such as a display 122.

The display 122 is an output device configured to present information in a visual form. In particular, the display 122 may present visual content provided by the interactive content service 108, the interactive manager 124, an application 114, and the like. The visual content might include GUI elements, text, images, video, notifications, virtual buttons, virtual keyboards, messaging data, Internet content, device status, time, date, calendar data, preferences, map information, location information, and any other information that is capable of being presented in a visual form. For instance, the application 114A may present the application data 128D within the user interface 130 on the display 122. In some examples, the application data 128D may be associated with the creation of interactive content 118. For example, the application 114A may utilize an API 116 provided by the interactive content service 108 during the creation of the interactive content 118.

In some examples, the display 122 is a liquid crystal display ("LCD") utilizing any active or passive matrix technology and any backlighting technology (if used). In other examples, the display 122 may be an organic light emitting diode ("OLED") display. Other display types are contemplated. In addition, the display 122 can include an input device such as a touchscreen or multi-touch enabled touchscreen.

All or a portion of the applications 114 may utilize an interactive content service API 116 to interact with the interactive content service 108. As discussed above, the applications 114 might be any instructions or data that provide one or more functions. The applications 114 may be configured to call one or more methods exposed by the interactive content service API 116 to access the interactive content service 108 via a network to take advantage of one or more of the features provided by the interactive content service 108. In some examples, the API 116 exposes methods for the creation of the interactive content 118 as well as methods to specify what interpreter to utilize when providing interactive content to a user. The interactive content service API 116 might also be used by the applications 114 to control operations of the devices 102, request data from the computing devices 102 and/or other applications 114, and the like.

As illustrated, the interactive content service 108 includes the interactive manager 124 that manages one or more sessions during which users, such as the user 140B, interact with the interactive content 118. The interactive content service 108 may support connections to any number of computing devices 102 so that one or more users utilizing various computing devices 102 can interact with the interactive content service 108, and possibly with one another. As such, the illustrated example is merely illustrative, and should not be construed as being limiting in any way.

In the current example illustrated in FIG. 1, the interactive content service 108 identifies the computing devices 102 that are within the environment 104 associated with a user, such as the user 140B. The interactive manager 124, or some other device or component may identify the computing devices 102 that are available within the environment 104 using a discovery mechanism or a registration mechanism. For example, the interactive manager 124 may perform a network discovery of the devices 102 that are connected to a network in the environment associated with the user 140B. For instance, in some examples, a network discovery tool, possibly provided with an operating system, may be used to identify devices 102 connected to one or more networks in the environment.

In other configurations, all or a portion of the devices 102 may register with the interactive content service 108. For example, the computing device 102B may register with the interactive manager 124. The registration might include information about the device 102 being registered, such as whether the device has a speaker, or microphone and possibly device identifying information as well as how to control the devices. In some examples, the information about the connected devices 102 may be stored in the data store 134. After identifying the devices 102 connected to the network, the interactive manager 124 may query the devices or perform a look up of device data (e.g., from a local or remote storage, a search, and the like) to learn the capabilities of the devices.

Generally, the interactive content service 108 is operative to allow users, such as the user 140B to interact with the interactive content 118, and other applications that provide text-based output, using audio input and audio output. In the current example, the user 140B is talking to the computing device 102B. In some examples, the user 140B may request specific interactive content 118. For example, the user 140B may request an adventure game, a storybook, and the like. In other examples, the user 140B may request content from an application, such as application 114B that provides text-based content 142 from the interactive content service 108. In this way, the user 140B might be able to receive speech output from the interactive content service 108 instead of being restricted to receiving the text-based content 142 provide by the application 114B.

The interactive content service 108 can be configured to support interactive content in one or more of the publicly available interactive fiction formats and/or some other format. For example, the interactive content service 108 may support the TEXT ADVENTURE DEVELOPMENT SYSTEM ("TADS") or the ADVENTURE DEVELOPMENT & RUNNER—INTERACTIVE FICTION TOOLKIT ("ADRIFT") development systems. Other development systems that might be supported included ALAN, CHOICESCRIPT, HUGO, INFINIQUEST, JACL, QUEST, SUDS, TWINE, and the like. In this way, the network-based interactive content service may include interactive content that follows many different formats.

The interactive content service 108 might also utilize a variety of interpreters when providing the interactive content 118 to a user, such as the user 140B. For example, the interactive content service 108 might utilize functionality similar to the FROTZ, GARGOYEL, OR TEXT FICTION interpreters.

According to some examples, the speech input received by the computing device 102B may be provided to the interactive content service 108 for processing. For instance, the computing device 102B may provide the speech input to the interactive content service 108. In other configurations, the computing device 102B processes the speech input. For example, the computing device 102B and/or the interactive content service 108 may convert the speech input to text using a speech-to-text engine (not shown). The text may then be processed to identify the requested content. In some examples, the speech input is requesting interactive content 118. In other examples, the speech input is requesting content from an application operative to provide text-based content.

The interactive manager 124 may access the requested interactive content 118 or access the text-based content 142 provided by the application 114B. The interactive content 118 may be stored by the interactive content service 108 and/or a computing device 102B, or some other data store or memory, associated with the user 140B. For example, the interactive content service 108 may access the interactive content 118 from the data store 134. In some instances, the interactive content 118 may be sound files (e.g., .mpg or .way files), text files, or some other type of files. When the files are text files, a text-to-speech engine may be used by the interactive content service 108 and/or the computing device 102B to produce a sound file.

In some configurations, the interactive content service 108 stores the current state of the interactive content 118 associated with the user 140B in the interactive data 128A. For example, the state identifies a current location within the interactive content. In this way, regardless of what computing device 102 the user 140B is interacting with, the correct state associated with the interactive content 118 may be determined. Generally, the current state is a predefined state within the interactive content 118 as defined by the interactive content developer. For example, the current state specifies the location in the interactive content at which the user 140B is currently interacting. As the interactive manager 124 identifies a change in state (e.g., using one of the interpreters 136 supported by the interactive content service 108). In some configurations, the state information may also include the state of other users within interactive content 118. For example, in the case of a multi-player interactive fiction game, the interactive manager 124 may store the state for each of the players.

In the example of interacting with the interactive content 118, after determining the current state for the user 140B, and possibly other users, the interactive manager 124 causes a portion of the interactive content 118 to be output using the speaker 112. The interactive content manager 124 may send all or a portion of the interactive content 118 from the data store 134 within the interactive content service 108 to a computing device 102 associated with the user. Generally, a content developer, such as a content developer 140A, specifies the amount of interactive content 118 that is output. For instance, the content developer 140A defines the interactive content 118 in a format that is understandable to the interactive manager 124. In some examples, the content developer 140A uses one of the publicly available interactive fiction languages or development tools, described above, to define the interactive content. Instead of the content provider 140A having to worry about maintaining state information and interactive sessions with the users, the content provider 140A may focus their efforts on the development of the interactive content.

According to some configurations, the computing device 102A may be used by the content provider 140A when developing the interactive content 118. For example, the content developer 140A may provide recorded audio (e.g., speech) that may be stored by the interactive content service in the interactive content 118. In other examples, the recorded audio may come from a user, such as the user 140B. In yet other examples, a text-to-speech engine may generate the speech. For example, a text-to-speech engine may generate audio files from existing text-based interactive fiction that is publicly available or created by the content provider 140A. In this way, existing text-based interactive fiction might be provided to users utilizing the interactive content service 108.

In some examples, the interactive content manager 124 may send an identification of all or a portion of the content to the computing device 102B. For example, the interactive content manager 124 may provide a location, a file name, or some other indication of how to access the interactive content 118. The interactive content is provided to the user as auditory output (e.g., through the speaker 112).

During the session with the user 140B, the devices 102 associated with the user 140B may be monitored for speech input. For example, the computing device 102B may receive speech input from the user 140B while the user 140B is interacting with the interactive content 118. For example, speech obtained from the user 140B using the microphone 110 may be provided to interactive manager 124.

When speech input is received from the user 140B while interacting with the interactive content 118, the interactive manager 124 may identify other interactive content 118 to provide to the user 140B as auditory output. As discussed in more detail in FIG. 2, the interactive content provided to the user 140B may change depending on the environment of the user 140B.

As briefly discussed above, the user 140B may also request content from an application, such as the application 114B via the interactive content service 108. In this way, the user 140B may interact with the application 114B (which may not be speech enabled) using speech input and speech output. In some examples, the application 114B may be executed on a client computing device that is connected to the interactive content service 108. In other examples, the application 114 GB may be executed by the application execution service 138 within the service provider network 120. The application 114B may be executed on behalf of the user 140 within the application execution service 138 and may provide text-based content 142 that is converted to audio content by the interactive manager 124. In some examples, the interactive manager may convert the text-based content 142 to speech output using a text-to-speech engine. In some configurations, the text-based content 142 may be determined by the interpreter 136 may by examining output provided by the application 114B and/or examining messages provided by the application 114B. For example, when the application is an ANDROID application, the interpreter 136 may identify the text-based content 142 by examining the intents provided by the application 114B. Generally, an intent is a messaging object that requests an action from another component. An intent may be used to start an activity, start a service, deliver a broadcast, receive data from another application, send data to another application, and the like. In some configurations, the interactive content service 108 may include functionality developed to support the application 114B. For example, the interactive content service 108 may register to receive data from the application 114B (e.g., through intents or some other mechanism).

As briefly discussed above, content providers may develop the interactive content 118 using a software developer toolkit ("SDK") that may include an application programming interface ("API"), such as the interactive content service API 116. It should be understood that various implementations of the operating environment 100 include multiple networks, interactive content services 104, application services 106, application execution services 108, applications 114 and interactive content service APIs 116. As such, the illustrated operating environment 100 should be understood as being illustrative, and should not be construed as being limiting in any way.

Figure 2:
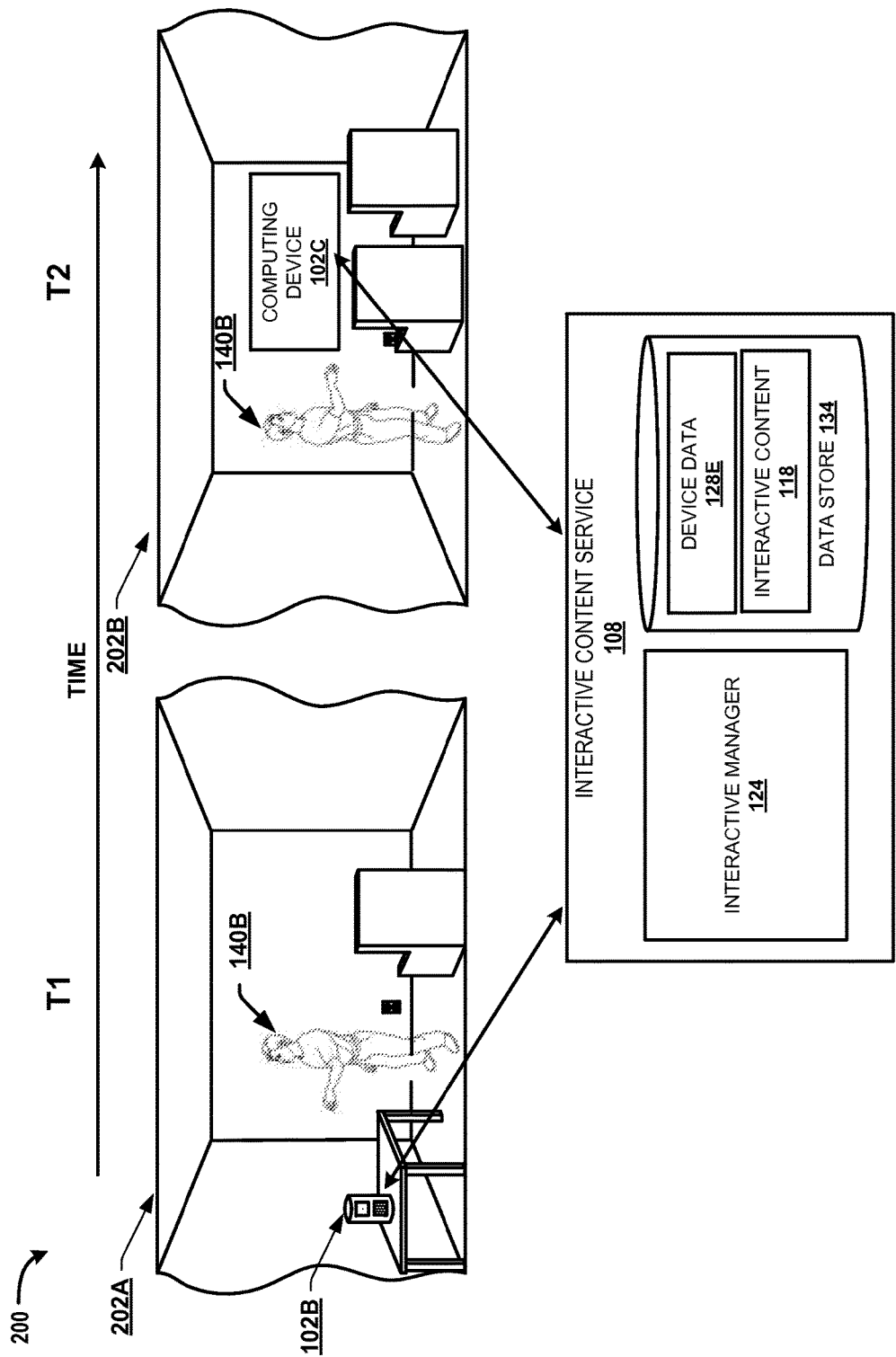
FIG. 2 is a system diagram that illustrates a user changing locations in an environment while interacting with the interactive content.

FIG. 2 is a system diagram 200 that illustrates a user 140B changing locations in an environment 202 while interacting with the interactive content. System diagram 200 includes the interactive content service 108 in communication with the computing device 102B in environment 202A and the computing device 102C in the environment 202B. The interactive content service 108 may include the interactive manager 124, the data store 134, as well as other components (not shown).

In the example illustrated in FIG. 2, the user 140B at time T1 is located within the environment 202A. During this time, the computing device 102B is providing the auditory output and is receiving the speech input from the user 140B while interacting with the interactive content 118. As discussed briefly above, the user 140B may change locations while interacting with the interactive content 118. In the current example, the user moves from environment 202A to environment 202B at time T2.

During time T2, the computing device 102C is providing the auditory output and is receiving the speech input from the user 140B while interacting with the interactive content 118. The computing device 102C may be the same type of computing device as computing device 102B or some other type of computing device 102. For example, the computing device 102C may be a smart television, or smart phone, and the like.

According to some configurations, the computing devices 102 that may be used to interact with the user 140B within an environment 202 may be identified by the interactive manager 124. For example, each computing device 104 that is located within environment 202A and environment 202B may be identified before or during an interactive session. According to some configurations, the interactive manager 124, or some other device or component may identify the computing devices 102B and 102C that may be used for outputting the interactive content 118 and be used to receive the speech input from the user 104B. In some examples, one or more devices within the environment 202 may be used. For instance, one device (e.g., a speaker) may be used to provide the auditory output, and another device (e.g., a microphone) may be used to obtain the speech input (e.g., a microphone).

In some configurations, as discussed above, the computing devices 102 are determined using a discovery mechanism or a registration mechanism. For example, the interactive manager 124 may instruct a computing device 102 in the environment 202 of the user 140B to perform a network discovery of the devices that are connected to a network in the environment associated with the user 140 and that may be used in interacting with the interactive content 118. In other examples, all or a portion of the computing devices 102 may register with the interactive content service 108. In some examples, the interactive manager 124 stores the information about the available computing devices 102 as device data 128E in the data store 134.

While the user 140B is interacting with the environment 202, the location of the user may be determined. For example, computing device 102B or computing device 102C within the environment of the user may be used to determine the location of the user 140B. For example, the computing device 102B may "hear" the user 140B when the user 140B is located in the same room (or within the hearing range of the computing device 102B). In other examples, a smart phone, or some other device typically near the user may provide location information to the interactive manager 124. In some examples, the location may be identified as a particular room of the environment (e.g., a living room, kitchen, or bedroom of a house).

In some examples, the location of the user 140B may change the interactive content 128A that is provided to the user. For example, a content developer 140A may specify that the interactive content 128A changes when the user 140B moves from the environment 202A to the environment 202B. In other examples, the interactive content may not change. Generally, the content developer 140A specifies the conditions upon which the interactive content 128 is to change. When the interactive content 128 provided to the user is to be adjusted, interactive manager may change the interactive content 128A that is provided to the user 140B.

Figure 3:
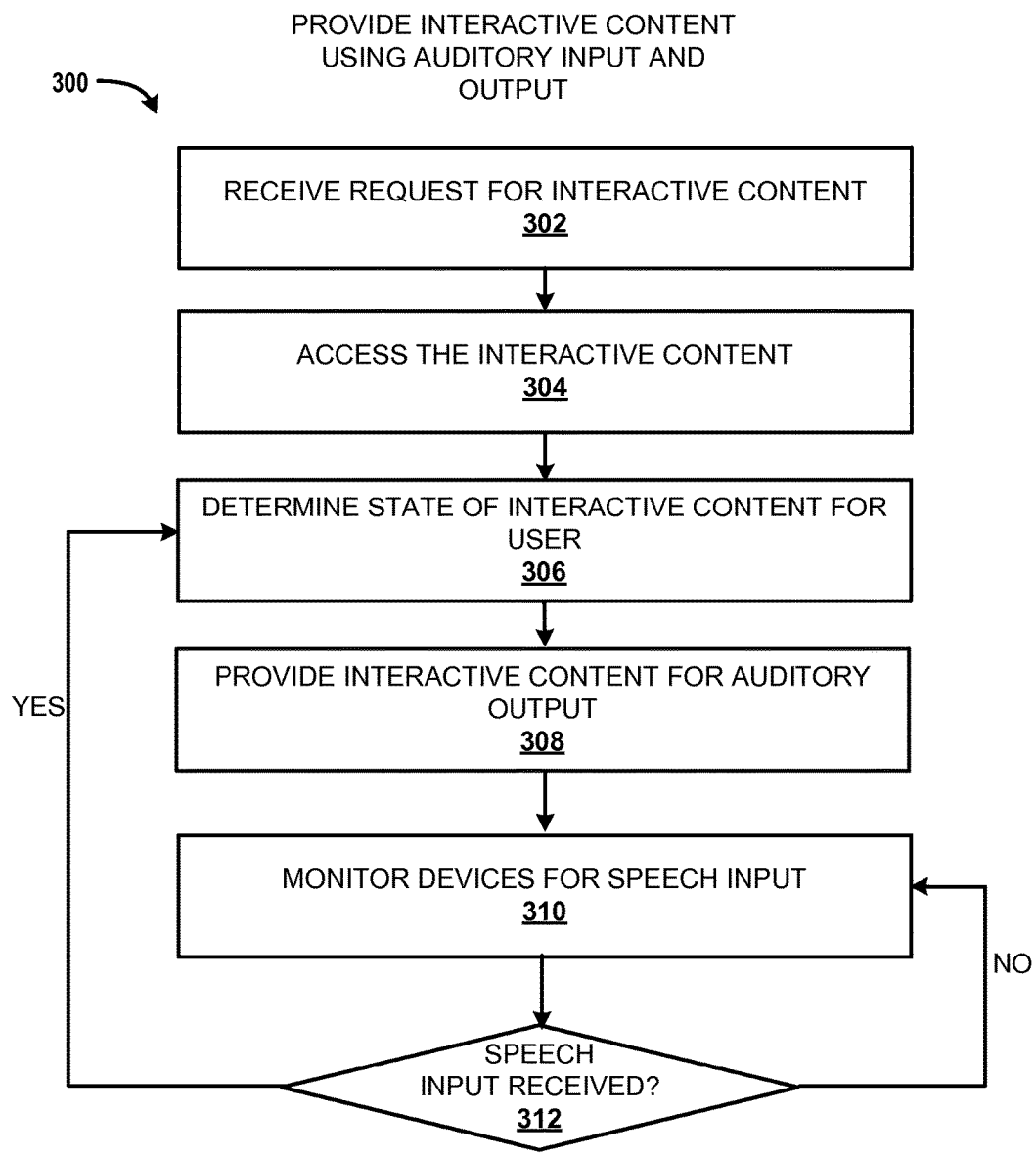
FIG. 3 is a flow diagram showing a routine illustrating aspects of a mechanism disclosed herein for providing interactive content using auditory input and output.
Figure 4:
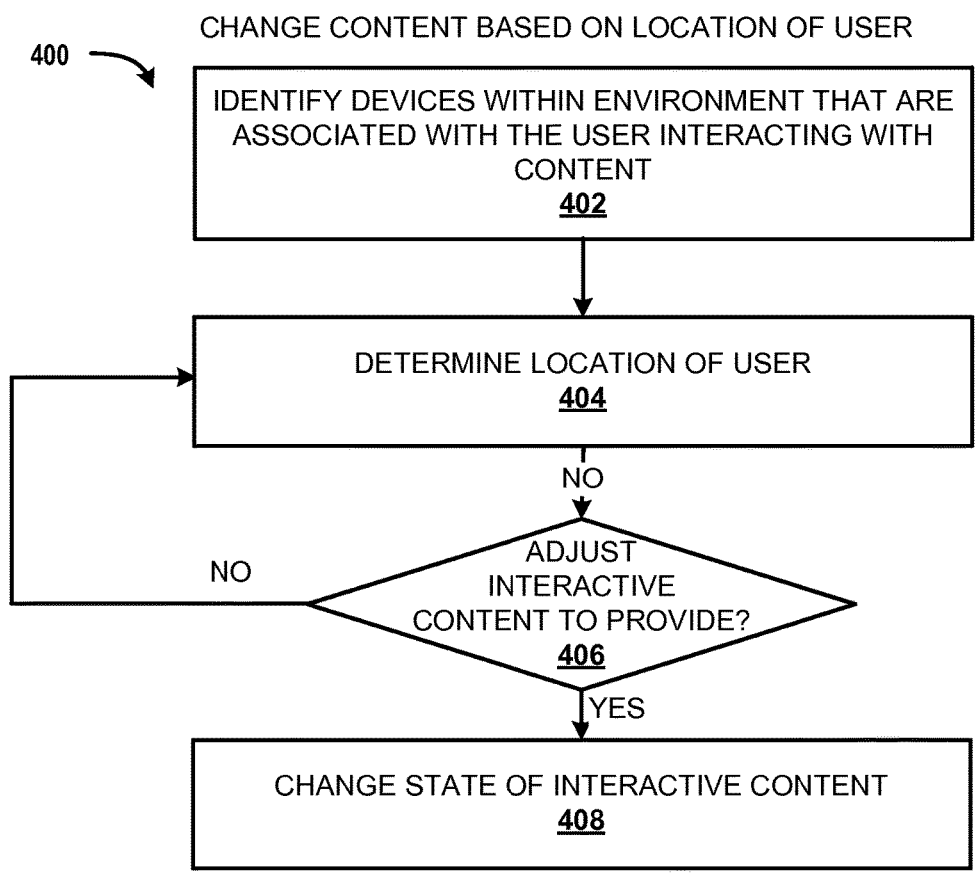
FIG. 4 is a flow diagram showing a routine illustrating aspects of a mechanism disclosed herein for changing the interactive content provided to the user in response to the user changing locations.
Figure 5:
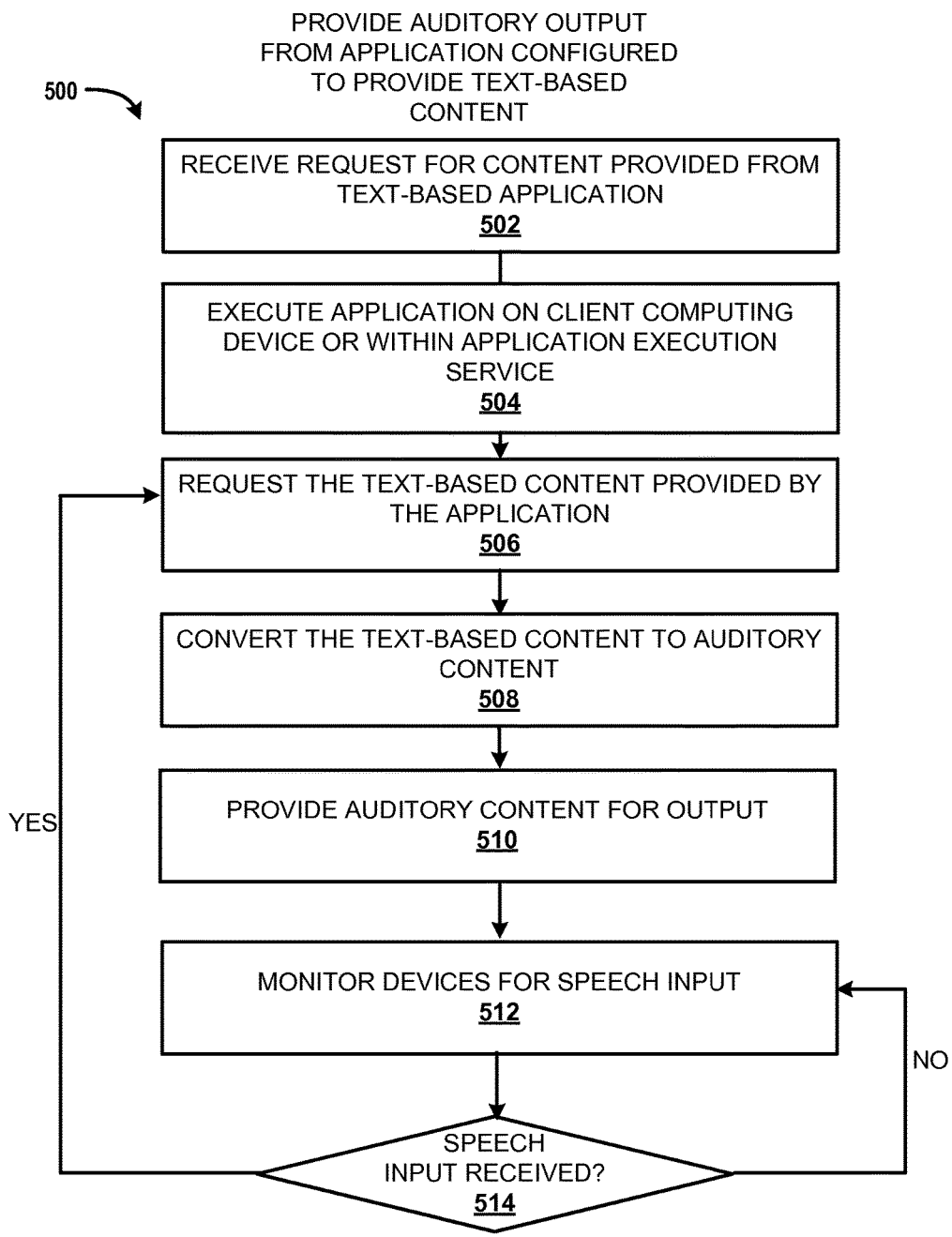
FIG. 5 is a flow diagram showing a routine illustrating aspects of a mechanism disclosed herein for providing auditory output from an application configured to provide text-based content.

FIGS. 3, 4, and 5 are flow diagrams showing routines that illustrate aspects of providing content according to examples disclosed herein. It should be appreciated that the logical operations described herein with respect to FIGS. 3, 4, and 5, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 3 is a flow diagram showing a routine 300 illustrating aspects of a mechanism disclosed herein for providing interactive content using auditory input and output. At 302, a request may be received for interactive content. As discussed above, a user may use speech input to request the interactive content. In some examples, the speech input may be provided to the interactive content service 108 for processing. For instance, a computing device 102 that is located within the environment of the user may receive the speech input and provide the speech input to the interactive content service 108. In other examples, a computing device 102, such as the computing device 102B that receives the speech input that is located within the environment of the user 140B may process the speech input. In some examples, the speech input may be converted to text by a speech-to-text engine, and then the text parsed to identify the requested content.

At 304, the interactive content 118 is accessed. As discussed above, the interactive content 118 may be stored by the interactive content service 108 and/or a computing device 102 associated with the user. For example, the interactive content service 108 may access the interactive content 118 from the data store 134. In some instances, the interactive content 118 may be sound files (e.g., .mpg or .wav files), text files, or some other type of files. When the files are text files, a text-to-speech engine may be used to produce a sound file.

At 306, the current state of the interactive content 118 associated with the user is determined. As discussed above, the interactive content service 108 may store the state of an interactive session for a user. In this way, regardless of what computing device 102 the user is interacting with, the correct state associated with the interactive content may be determined. Generally, the current state is a predefined state within the interactive content as defined by the interactive content developer. The state for the interactive content 118 may include state for one or more users. For example, for interactive content used by a single user (e.g., a single player text based interactive game), the state indicates the current state for the single player. In the case of a multi-player text based interactive game, the state indicates the current state for each of the players in the text based interactive game.

At 308, the interactive content 118 associated with the current state is provided for auditory output. As discussed above, the interactive content manager 124 may send all or a portion of the interactive content 118 from the data store 134 within the interactive content service 108 to a computing device 102 associated with the user. In some examples, the interactive content manager 124 may send an identification of all or a portion of the content to the computing device 102. For example, the interactive content manager 124 may provide a location, a file name, or some other indication of how to access the interactive content 118. The interactive content is provided to the user as auditory output (e.g., through a speaker associated with the computing device 102B).

At 310, the devices associated with the user may be monitored for speech input. As discussed above, one or more computing devices 102 may receive speech input from the user while interacting with the interactive content 118. For example, a microphone associated with the computing device 102B may receive the speech input.

At 312, a determination is made as to whether speech input is received. When speech input is received, the routine 300 may return to 306. When speech input is not received, the process 300 may return to 310 for further monitoring.

FIG. 4 is a flow diagram showing a routine 400 illustrating aspects of a mechanism disclosed herein for changing the interactive content 128A provided to the user in response to the user changing locations. The routine 400 may begin at 402, where devices within an environment that are associated with the user may be identified.

As discussed above, the interactive manager 124, or some other device or component may identify the computing devices associated with outputting auditory content or receiving speech input may be determined using a discovery mechanism or a registration mechanism. For example, the interactive manager 124 may instruct a computing device 102 in the environment of the user 140B to perform a network discovery of the devices that are connected to a network in the environment associated with the user 140 and that may be used in interacting with the interactive content 118. In other examples, all or a portion of the computing devices 102 may register with the interactive content service 108.

At 404, the location of the user may be determined. As discussed above, a computing device 102 within the environment of the user may be used to determine the location of the user 140B. For example, a computing device 102B located in the same area as the user 140B may "hear" the user. In other examples, a smart phone, or some other device typically near the user may provide location information to the interactive manager 124. In some examples, the location may be identified as a particular room of the environment (e.g., a living room, kitchen, or bedroom of a house).

At 406, a determination is made as to whether to adjust the interactive content being provided based on the location of the user. As discussed above, the location of the user may change the interactive content 118 that is provided to the user. For example, a content developer 140A may change the interactive content 118 when the user moves from the bedroom to the kitchen, from the kitchen to the living room, and the like. In other examples, the interactive content may not change. When the interactive content 118 being provided to the user is to be adjusted, the routine 400 moves to 408. When the interactive content 128 being provided to the user is not to be adjusted, the routine 400 may return to 404.

FIG. 5 is a flow diagram showing a routine 500 illustrating aspects of a mechanism disclosed herein for providing auditory output from an application configured to provide text-based content. At 502, a request may be received for content provided by a text-based application 114B. As discussed above, a user may use speech input to request content from a text-based application. In some examples, the speech input may be provided to the interactive content service 108 for processing. For instance, a computing device 102 that is located within the environment of the user may receive the speech input and provide the speech input to the interactive content service 108. In other examples, a computing device 102, such as the computing device 102B that receives the speech input that is located within the environment of the user 140B may process the speech input. In some examples, the speech input may be converted to text by a speech-to-text engine, and then the text parsed to identify the requested content.

At 504, the application 114B may be executed. For example, if the application 114B is not already executing, the interactive manager 124 may launch the application for execution within the application execution service 138 or on a client computing device.

At 506, the text-based content 142 provided by the application 114B is requested. As discussed above, the interactive manage 124, or some other device or component, may request the text-based content 142 from the application 114B. In some examples, the interactive manager 124 uses intents to communicate with the application 114B. In other examples, the interactive manager 124 might access other functionality exposed by the application 114B to request the text-based content.

At 508, the text-based content 142 is converted to auditory content. For example, the interactive manager 124 may use a text-to-speech engine to convert the text-based content to auditory content, such as a sound file.

At 510, the auditory content is provided. As discussed above, the interactive content manager 124 may send the auditory content to a computing device 102 associated with the user. In some examples, the interactive content manager 124 may send an identification of all or a portion of the content to the computing device 102. For example, the interactive content manager 124 may provide a location, a file name, or some other indication of how to access the auditory content. In this way, the text-based content 142 provided by the application 114B is provided to the user as auditory output (e.g., through a speaker associated with the computing device 102B).

At 512, the devices associated with the user may be monitored for speech input. As discussed above, one or more computing devices 102 may receive speech input from the user while interacting with the application 114B. For example, a microphone associated with the computing device 102B may receive the speech input.

At 514, a determination is made as to whether speech input is received. When speech input is received, the routine 500 may return to 506. When speech input is not received, the process 500 may return to 510 for further monitoring.

Figure 6:
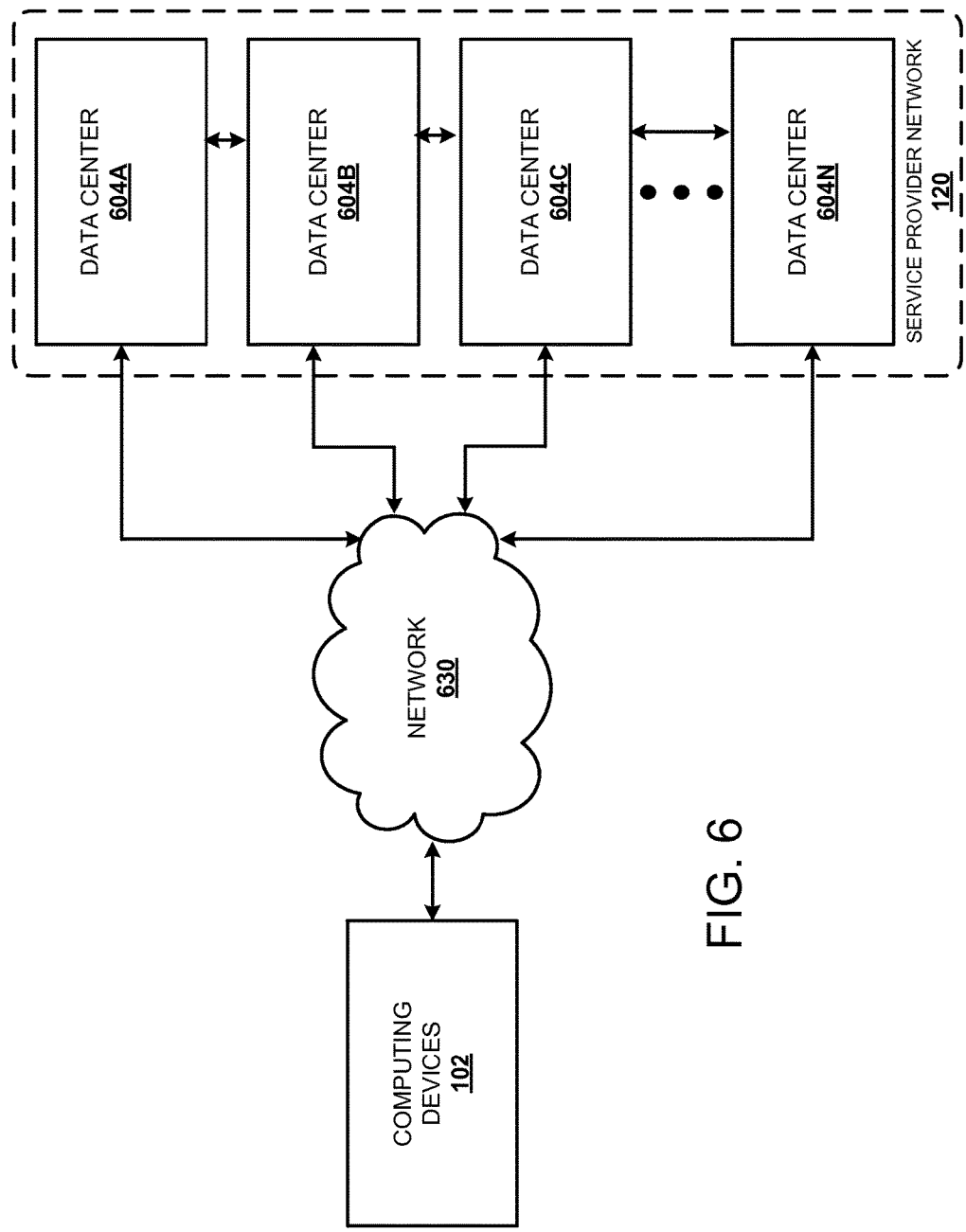
FIG. 6 is a system and network diagram that shows one illustrative operating environment for the examples disclosed herein that includes a service provider network.

FIG. 6 and the following description are intended to provide a brief, general description of a suitable computing environment in which the examples described herein may be implemented. In particular, FIG. 6 is a system and network diagram that shows an illustrative operating environment that includes a service provider network 120. As discussed above, service provider network 120 can provide virtual machine instances and computing resources on a permanent or an as-needed basis.

The computing resources provided by the service provider network 120 may include various types of resources, such as data processing resources, data storage resources, networking resources, data communication resources and the like.

Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 120 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein will be described below with regard to FIG. 7.

The users and customers of service provider network 120 may access the computing resources provided by the data centers 604 over a suitable data communications network, such as a Wide Area Network ("WAN"), as illustrated by network 630. Although a WAN might be used, it should be appreciated that a local-area network ("LAN"), the Internet, or any other networking topology known in the art that connects the data centers 604 to the computing devices 102 may be utilized. It should also be appreciated that combinations of such networks might also be utilized.

Figure 7:
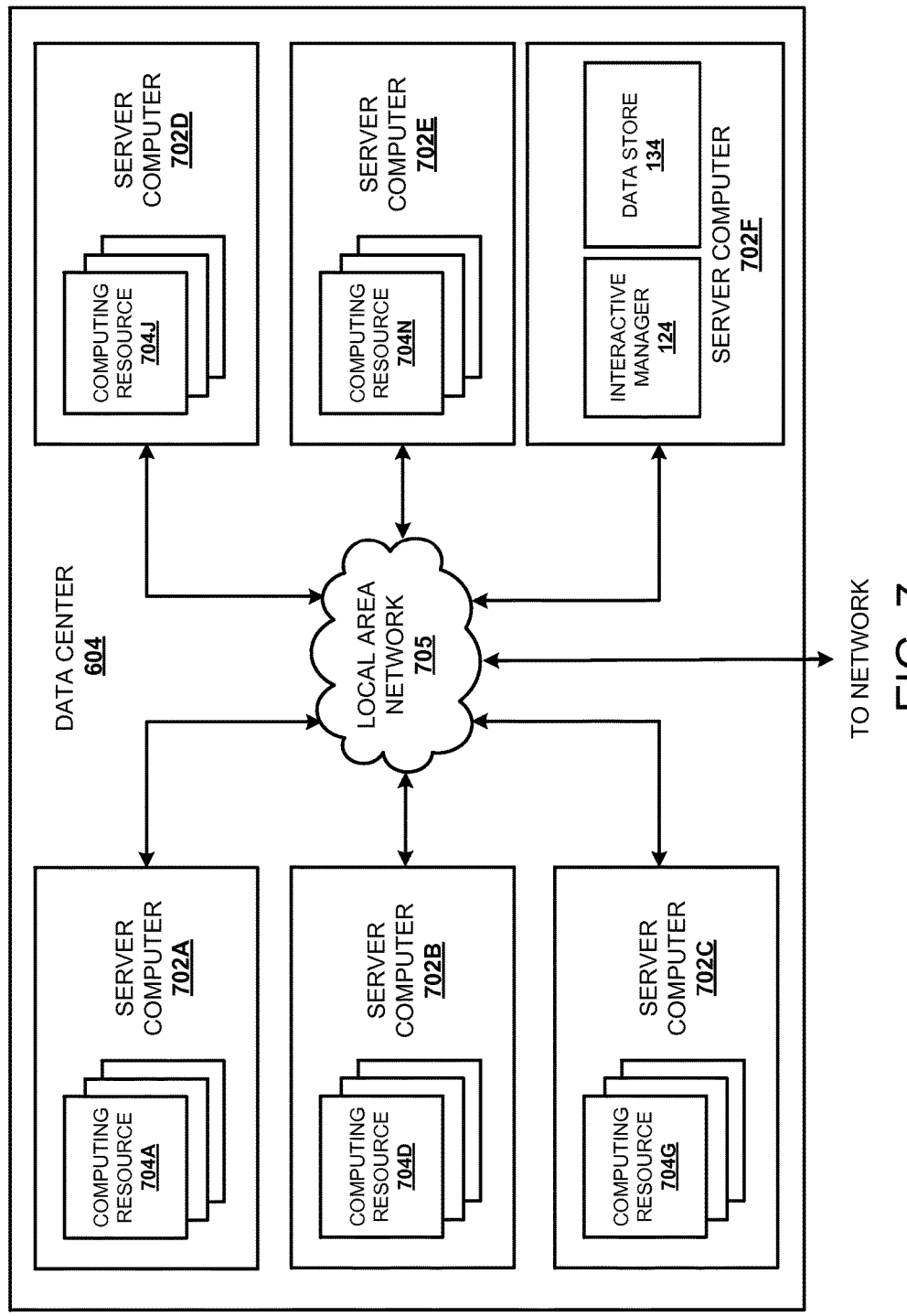
FIG. 7 is a computing system diagram that illustrates one configuration for a data center that implements aspects of a service provider network, including some or all of the concepts and technologies disclosed herein in for using auditory input and output to interact with text-based interactive content.

FIG. 7 is a computing system diagram that illustrates one configuration for a data center 604 that implements aspects of a service provider network 120, including some or all of the concepts and technologies disclosed herein for using auditory input and output to interact with text-based interactive content. The example data center 604 shown in FIG. 7 includes several server computers 702A-702F (which may be referred to herein singularly as "a server computer 702" or in the plural as "the server computers 702") for providing computing resources. The server computers 702 may be standard tower or rack-mount server computers configured appropriately for providing the computing resources described herein. According to an example, the server computers 702 are configured to execute the software products as described above.

In one example, some of the computing resources 704 are virtual machine instances. As known in the art, a virtual machine instance is an instance of a software implementation of a machine (i.e. a computer) that executes programs like a physical machine. Each of the server computers 702 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 702, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 702F reserved for executing software components for managing the operation of the data center 604, the server computers 702, virtual machine instances, and other resources within the service provider network 120. The server computer 702F might also execute the interactive manager 124A and include the data store 134A. Details regarding the operation of each of these components has been provided above. In this regard, it should be appreciated that while these components are illustrated as executing within service provider network 120, computing systems that are external to service provider network 120 might also be utilized to execute some or all of these components. Other configurations might also be utilized.

In the example data center 604 shown in FIG. 7, an appropriate local area network ("LAN") 705 is utilized to interconnect the server computers 702A-702E and the server computer 702F. The LAN 705 is also connected to the network 630 illustrated in FIG. 6. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 702A-702F in each data center 604 and between virtual machine instances and other types of computing resources provided by the service provider network 120.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
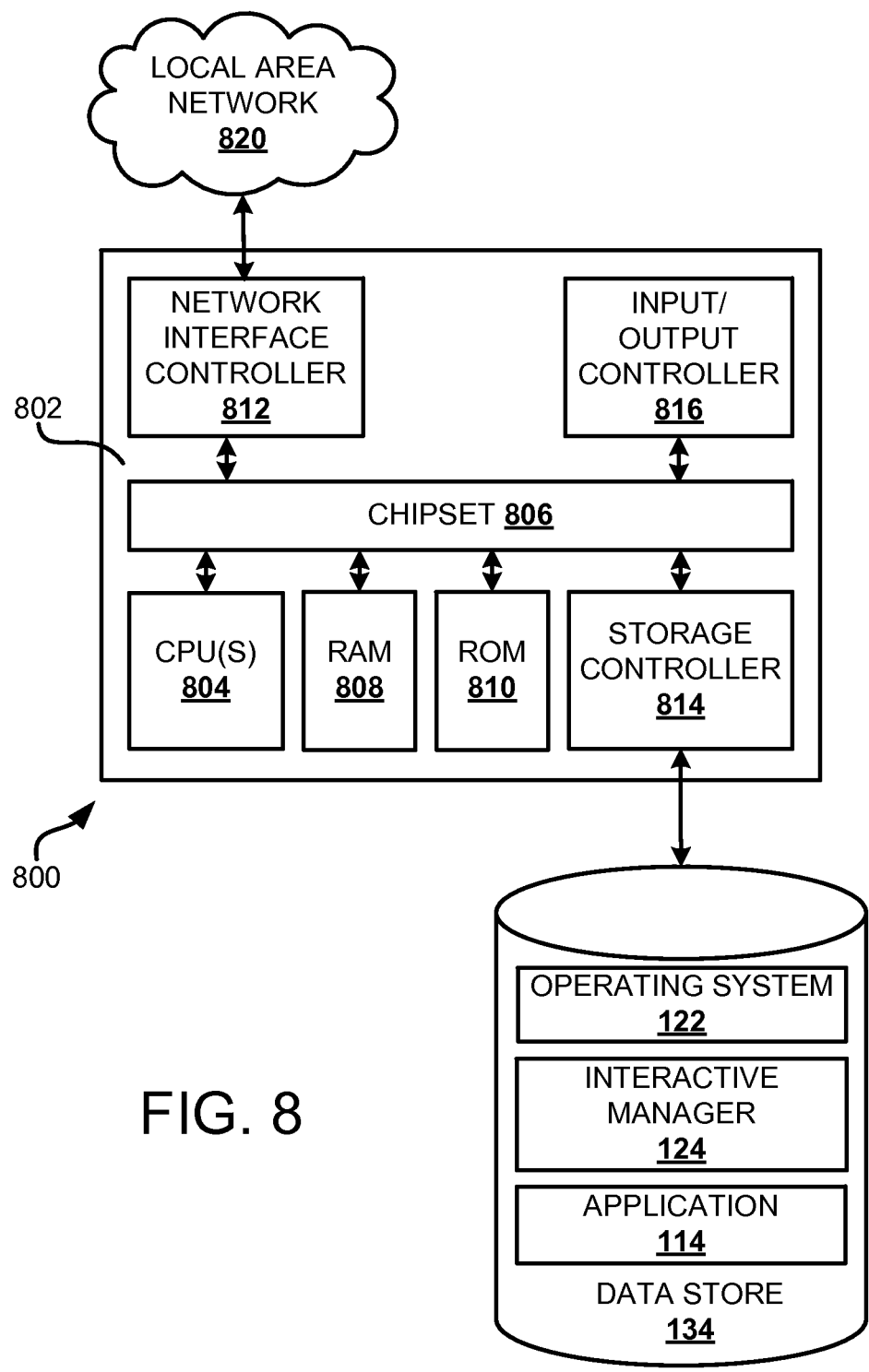
FIG. 8 is a computer architecture diagram showing one illustrative computer hardware architecture for implementing a computing device that might be utilized to implement aspects of the various examples presented herein.

FIG. 8 shows an example computer architecture for a computer 800 capable of executing program components for using auditory input and output to interact with text-based interactive content in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations as described above. The computer architecture shown in FIG. 8 might also be utilized to implement a computing device 102, a computing device utilized in the interactive content service 108, the application service 110 or the application execution service 112 or any other of the computing systems described herein.

The computer 800 includes a baseboard 802, or "motherboard," which is a printed circuit board to which a multitude of components or devices may be connected by way of a system bus or other electrical communication paths. In one illustrative example, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the examples described herein.

The computer 800 may operate in a networked environment using logical connections to remote computing devices and computer systems through a network, such as the local area network 820. The chipset 806 may include functionality for providing network connectivity through a network interface controller ("NIC") 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a data store, such as the data store 134, that provides non-volatile storage for the computer. The data store 134 may store system programs, application programs, other program modules and data, which have been described in greater detail herein. The data store 134 may be connected to the computer 800 through a storage controller 814 connected to the chipset 806. The data store 134 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the data store 134 by transforming the physical state of the physical storage units to reflect the information being stored. The specific transformation of physical state may depend on various factors, in different implementations of this description. Examples of such factors may include, but are not limited to, the technology used to implement the physical storage units, whether the data store 134 is characterized as primary or secondary storage and the like.

For example, the computer 800 may store information to the data store 134 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the data store 134 by detecting the physical states or characteristics of one or more particular locations within the physical storage units.

In addition to the data store 134 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The data store 134 may store an operating system 830 utilized to control the operation of the computer 800. According to one example, the operating system comprises the LINUX operating system. According to another example, the operating system comprises the WINDOWS® SERVER operating system from MICROSOFT Corporation. According to further examples, the operating system may comprise the UNIX operating system or the ANDROID operating system. It should be appreciated that other operating systems may also be utilized. The data store 134 may store other system or application programs and data utilized by the computer 800, such as components that include the interactive manager 124, the application 114 and/or any of the other software components and data described above. The data store 134 might also store other programs and data not specifically identified herein.

In one example, the data store 134 or other computer-readable storage media is encoded with computer-executable instructions which, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various routines described above with regard to FIGS. 3-5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for using auditory input and output to interact with interactive content have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium comprising computer-executable instructions stored thereupon which, when executed by a computer, cause the computer to:

receive, at a network-based interactive content service, a first auditory in put request to access interactive content;

access state information that indicates a current state of the interactive content associated with the user;

identify a plurality of computing devices that are located within an environment associated with the user;

identify a first location of the user within the environment;

identify, at the network-based interactive content service, a first portion of the interactive content to provide based at least in part upon the current state and the first location of the user;

access, at the network-based interactive content service, the first portion of the interactive content;

provide the first portion of the interactive content for first auditory output on a first output computing device selected from the plurality of computing devices based, at least in part, upon the first location of the user;

receive, from a second computing device located within the environment, a second auditory input;

identify a second location of the user within the environment;

select, at the network-based interactive content service, a second portion of the interactive content from at least two different portions of interactive content to provide based, at least in part, on processing of the second auditory input; and provide the second portion of the interactive content for second auditory output on a second output computing device that is selected from the second computing device or the plurality of computing devices based, at least in part upon the second location of the user.

2. The non-transitory computer-readable storage medium of claim 1, wherein the interactive content is a text-based adventure game.

3. The non-transitory computer-readable storage medium of claim 1, wherein the instructions further cause the computer to maintain, at the network-based interactive content service, state information about a state of the interactive content for a plurality of users.

4. The non-transitory computer-readable storage medium of claim 1, wherein accessing the interactive content comprises accessing a data store that includes a plurality of interactive content created by different content developers.

5. The non-transitory computer-readable storage medium of claim 1, wherein the instructions further cause the computer to identify the user associated with the request.

6. A system, comprising:
a plurality of computing devices, including one or more processors, operating in a network-based interactive content service, the plurality of computing devices operative to:
receive, from a computing device associated with a user of the network-based interactive content service, a first auditory input, the first auditory input requesting interactive content associated with an interactive session or requesting auditory content from an application that provides text-based content, wherein the computing device is located within an environment associated with the user;
access state information that indicates a current state of the interactive content associated with the user;
identify one or more other computing devices that are located within the environment;
identify a first location of the user within the environment;
identify, at the network-based interactive content service, a first portion of the interactive content to provide based at least in part upon the current state and the first location of the user within the environment;
select the first portion of the interactive content to provide based, at least in part, on the first auditory input;
cause, based at least in part on the first location of the user within the environment, the first portion of the interactive content to be presented to the user as first auditory output on an output computing device that is selected from the computing device or the one or more other computing devices;
receive, from a second computing device located within the environment, a second auditory input;
identify a second location of the user within the environment;
select, at the network-based interactive content service, second content from at least two portions of content based, at least in part, on the second auditory input; and
cause the second content to be presented for second auditory output on a second output computing device that is selected from the second computing device or the plurality of computing devices based, at least in part, upon the second location of the user.

7. The system of claim 6, wherein the one or more computing devices are further operative to execute the application on behalf of the user and wherein select the first portion of the interactive content comprises receiving from the application text-based content, and converting the text-based content to the first auditory output.

8. The system of claim 6, wherein the one or more computing devices are further operative to store state information associated with a plurality of users.

9. The system of claim 6, wherein the first portion of the interactive content is auditory content created by an individual associated with the user.

10. The system of claim 6, wherein the one or more computers operating in the network-based interactive content service are further operative to provide at least a portion of the state information to the second computing device located within the environment during the interactive session.

11. The system of claim 6, wherein selecting the first portion of the interactive content comprises accessing a data store within the network-based interactive content service that stores instances of interactive content created by different content developers.

12. The system of claim 6, wherein the network-based interactive content service exposes an Application Programming Interface (API) used by an application to interact with the one or more computing devices operating in the network-based interactive content service, the application operative to present the first portion of interactive content.

13. A computer-implemented method, comprising:
receive, at a network-based interactive content service, a first auditory input request to access interactive content;
obtaining, from a network-based interactive content service, state information that indicates a current state of the interactive content associated with a user;
identifying computing devices that are located within an environment associated the user;
identifying a first location of the user within the environment;
identifying, at the network-based interactive content service, a first portion of the interactive content to provide based at least in part upon the current state and the first location of the user;
accessing, from the network-based interactive content service, the first portion of the interactive content associated with the interactive content session;
causing, from the network-based interactive content service the first portion of the interactive content to be presented as first auditory output on a first output computing device selected from the computing devices based, at least in part, on the first location of the user within the environment;
receive, from a second computing device located within the environment, a second auditory input;
identify a second location of the user within the environment;
select, at the network-based interactive content service, a second portion of the interactive content from at least two different portions of interactive content to provide based, at least in part, on processing of the second auditory input; and
provide the second portion of the interactive content for auditory output on a second output computing device that is selected from the second computing device or the computing devices based, at least in part, upon the second location of the user.

14. The computer-implemented method of claim 13, wherein causing the first portion of the interactive content to be presented as first auditory output comprises playing a sound file on the first output computing device selected from the computing devices.

15. The computer-implemented method of claim 13, wherein accessing the first portion of the interactive content comprises accessing the first portion of the first interactive content from the network-based interactive content service and accessing the second portion of the interactive content from a computing device selected from the computing devices.

16. The computer-implemented method of claim 13, wherein the network-based interactive content service exposes an Application Programming Interface (API) to access functionality associated with the interactive session.

\* \* \* \* \*